(12) United States Patent
Phelan

(10) Patent No.: US 9,308,606 B2
(45) Date of Patent: Apr. 12, 2016

(54) REPAIR STAKE FOR SUPPORTING ARTICLE

(76) Inventor: Wayne Charles Phelan, Sheffield (GB)

( * ) Notice: Subject to any disclaimer, the term of this patent is extended or adjusted under 35 U.S.C. 154(b) by 185 days.

(21) Appl. No.: 14/125,285

(22) PCT Filed: Jun. 14, 2012

(86) PCT No.: PCT/GB2012/051374
§ 371 (c)(1),
(2), (4) Date: Dec. 10, 2013

(87) PCT Pub. No.: WO2012/175937
PCT Pub. Date: Dec. 27, 2012

(65) Prior Publication Data
US 2014/0109371 A1    Apr. 24, 2014

(30) Foreign Application Priority Data
Jun. 21, 2011   (GB) .................................. 1110497.3

(51) Int. Cl.
*B23P 6/00* (2006.01)
*E04H 12/22* (2006.01)
(52) U.S. Cl.
CPC .............. *B23P 6/00* (2013.01); *E04H 12/2292* (2013.01); *Y10T 29/49718* (2015.01)
(58) Field of Classification Search
CPC .. E04H 12/2292; B23P 6/00; Y10T 29/49718
See application file for complete search history.

(56) References Cited

U.S. PATENT DOCUMENTS

| 427,815 | A |   | 5/1890 | Wolf |
|---|---|---|---|---|
| 1,584,405 | A |   | 5/1926 | Spring |
| 1,640,739 | A | * | 8/1927 | Trester ............................... 249/3 |
| 5,058,337 | A | * | 10/1991 | O'Connor ....................... 52/162 |
| 5,158,258 | A | * | 10/1992 | McFadzean .................. 248/500 |
| 5,345,732 | A |   | 9/1994 | Knight et al. |
| 5,542,210 | A | * | 8/1996 | Hupfl ................................ 47/47 |
| 5,636,482 | A |   | 6/1997 | Klager |
| 6,666,625 | B2 | * | 12/2003 | Thornton ...................... 405/284 |
| 2001/0045553 | A1 |   | 11/2001 | Pilcher |

FOREIGN PATENT DOCUMENTS

| CH | 269316 A | 10/1950 |
|---|---|---|
| DE | 19525828 A1 | 1/1997 |
| GB | 2332232 A | 6/1999 |
| WO | 84/04348 A1 | 11/1984 |

* cited by examiner

*Primary Examiner* — Ryan J Walters
(74) *Attorney, Agent, or Firm* — patenttm.us

(57) ABSTRACT

A repair arrangement (10) comprises an insertion portion (12) and a securing portion (14). The insertion portion is configured for insertion into the ground adjacent an article (100) to be repaired. The securing portion has securing formations (28, 29) to allow the repair arrangement to be secured to the article to be repaired.

18 Claims, 7 Drawing Sheets

Figure 1:
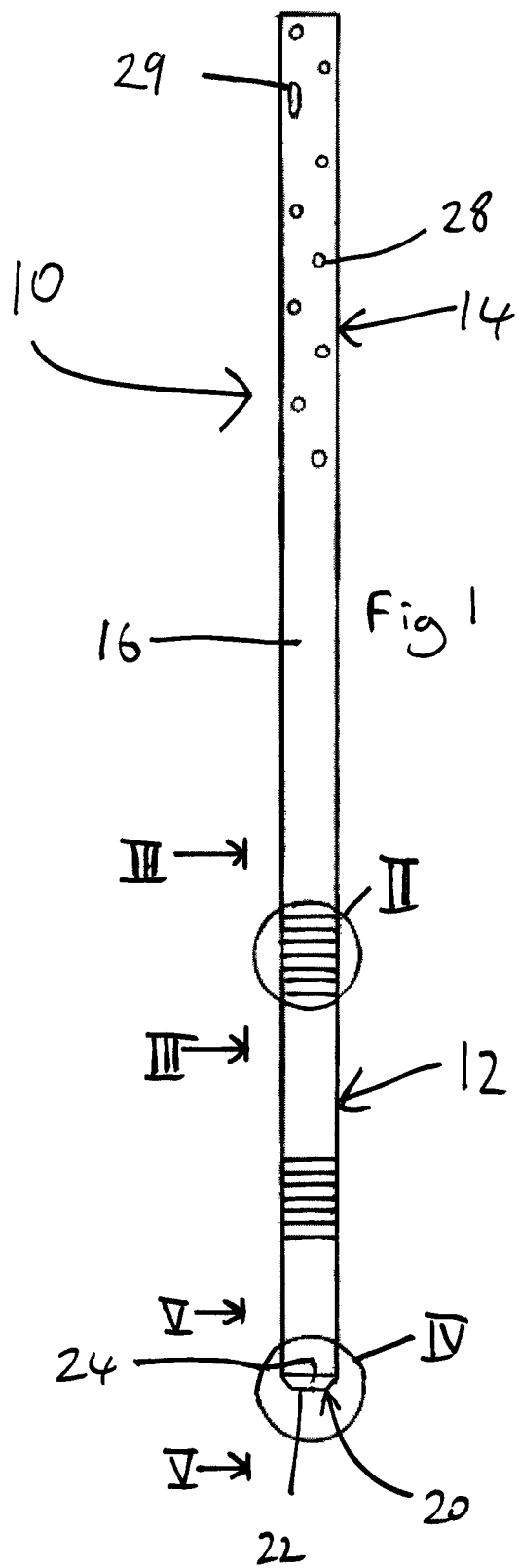

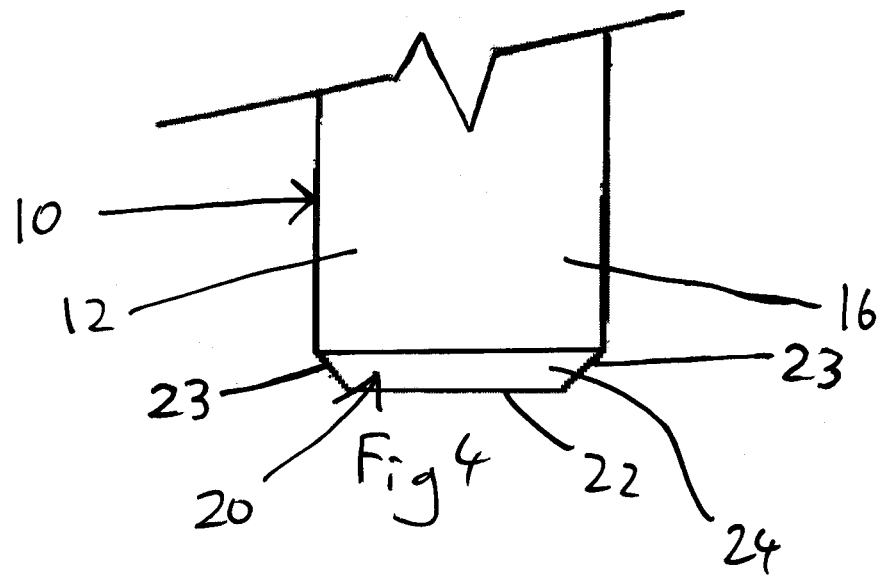
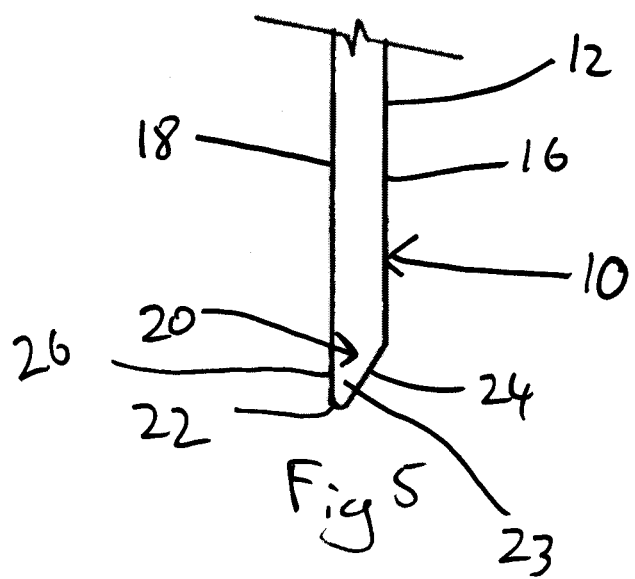

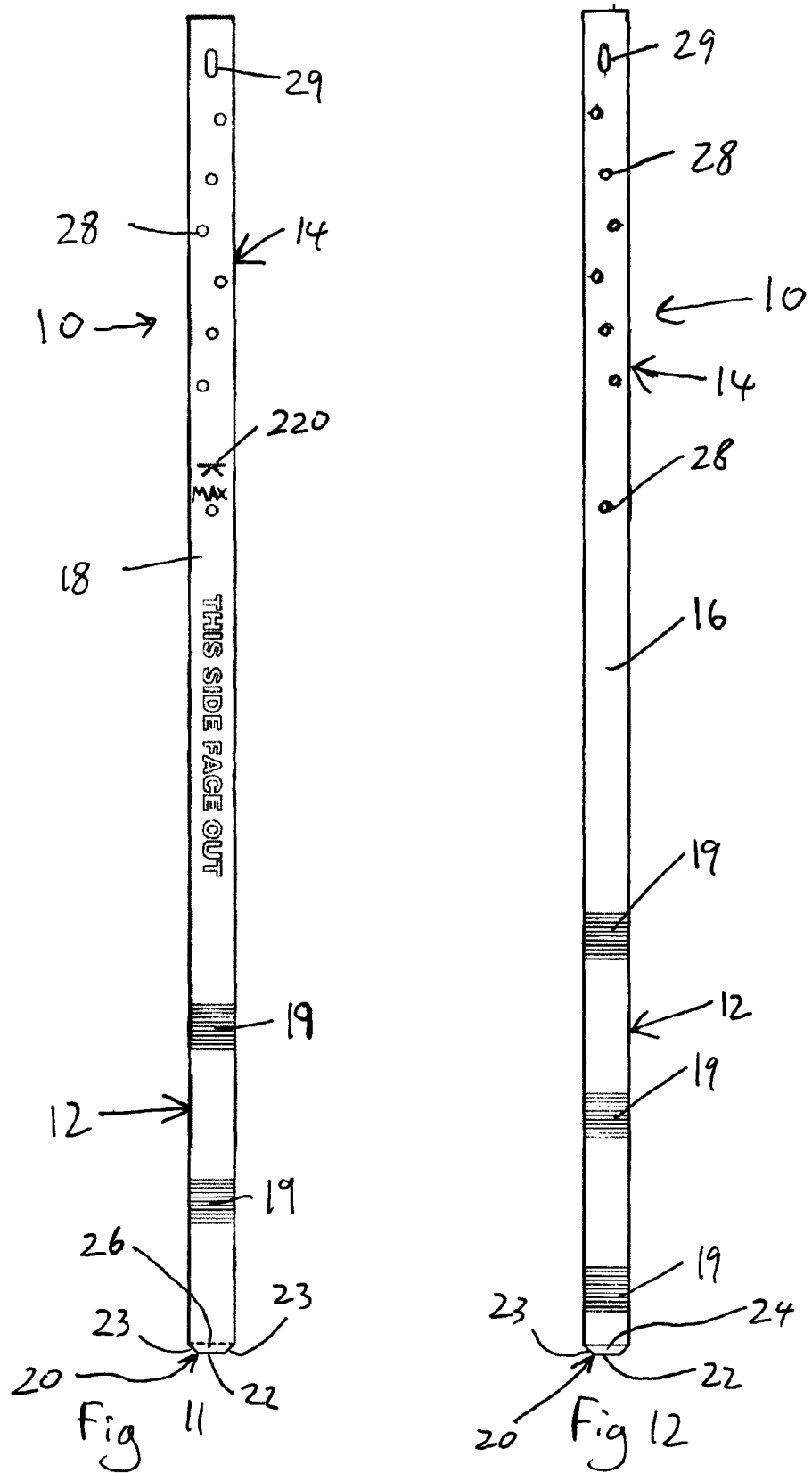

REPAIR STAKE FOR SUPPORTING ARTICLE

This invention relates to repair arrangements and to repair methods. More particularly, but not exclusively, this invention relates to repair arrangements for repairing articles disposed in the ground, and methods of preparing such articles. Embodiments of the invention relate to repair arrangements for repairing posts and to methods for repairing posts.

Timber posts, for example timber fence posts can become rotten and decayed where they come into contact with moisture. This is generally at ground level. In order to repair the damaged post, it is necessary to replace the post. This is a time-consuming and laborious task.

According to one aspect of this invention, there is provided a repair arrangement comprising an insertion portion and a securing portion, wherein the insertion portion is configured for insertion into the ground adjacent an article to be repaired, and the securing portion has securing formations to allow the repair arrangement to be secured to the article to be repaired.

The article to be repaired may be a post, such as a wooden post, which may be in need of repair, due to becoming damaged or decayed at or near ground level. The article may extend into the ground.

The article may be secured in the ground for example with concrete. The repair arrangement may have front and rear opposite main faces.

The repair arrangement may have a tapered end region, having an end edge, to facilitate insertion into the ground. The end region may have chamfered side edges to facilitate said insertion into the ground.

The tapered end region may have a front end face tapering outwardly from the end edge to the front main face. The tapered end region may have a rear end face coplanar with the rear main face. The tapered end region may have no more than one tapered end face.

The securing formations may be apertures defined in the securing portion. The apertures may be configured to receive therethrough securing members, such as nails or screws. The apertures may be defined in the securing portion along the length thereof.

The repair arrangement may be elongate, and may have a width and a depth, the width being greater than the depth. The repair arrangement may be substantially flat. The repair arrangement may be in the form of a one piece unit, and may comprise a stake, wherein the insertion portion and the securing portion constitute regions of the stake. The insertion portion and the securing portion may constitute opposite end regions of the stake. The securing portion may be attached to the insertion portion The repair arrangement may be formed of a suitable rigid material, for example a metal, such as steel.

The repair arrangement may include gripping formations to engage the article. The gripping formations may be provided on the front main face of the repair arrangement, suitably on the insertion portion. The gripping formations may comprise serrations.

According to another aspect of this invention, there is provided a method of repairing an article, said method comprising driving a repair arrangement as described above into the ground adjacent to the article to be repaired, and securing the repair arrangement to the article using the securing formations.

Where the article includes a tapered front end face, as described above, the repair arrangement may be arranged adjacent the article with the tapered front end face facing the article.

Where the article is secured in the ground with concrete, the repair arrangement may be driven into the ground between the concrete and the article, whereby the repair arrangement is held between the concrete and the article.

The article may be a post, such as a fence post, and may be formed of wood. Where the post has a generally rectangular top plan profile, the repair arrangement may be arranged adjacent two of the sides of the rectangle.

The repair arrangement may be arranged to restrict movement of the article in at least one vertical plane.

Figure 2:
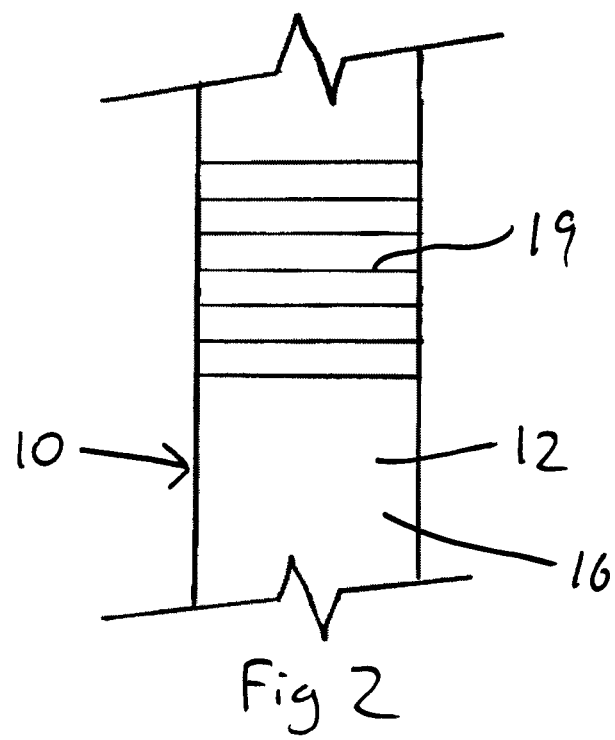
Figure 3:
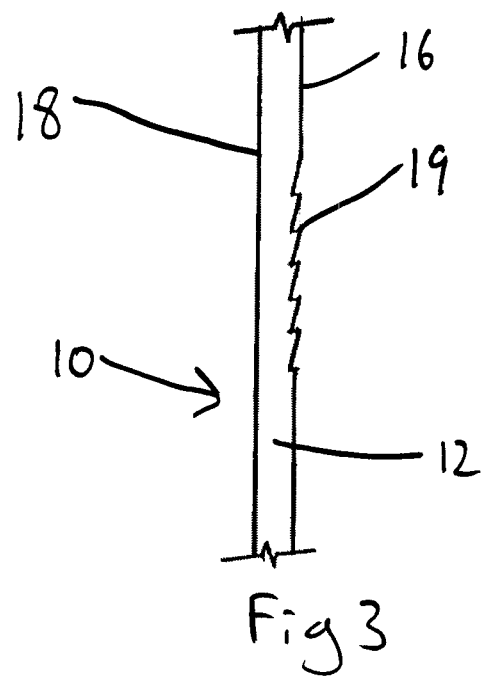
Figure 6:
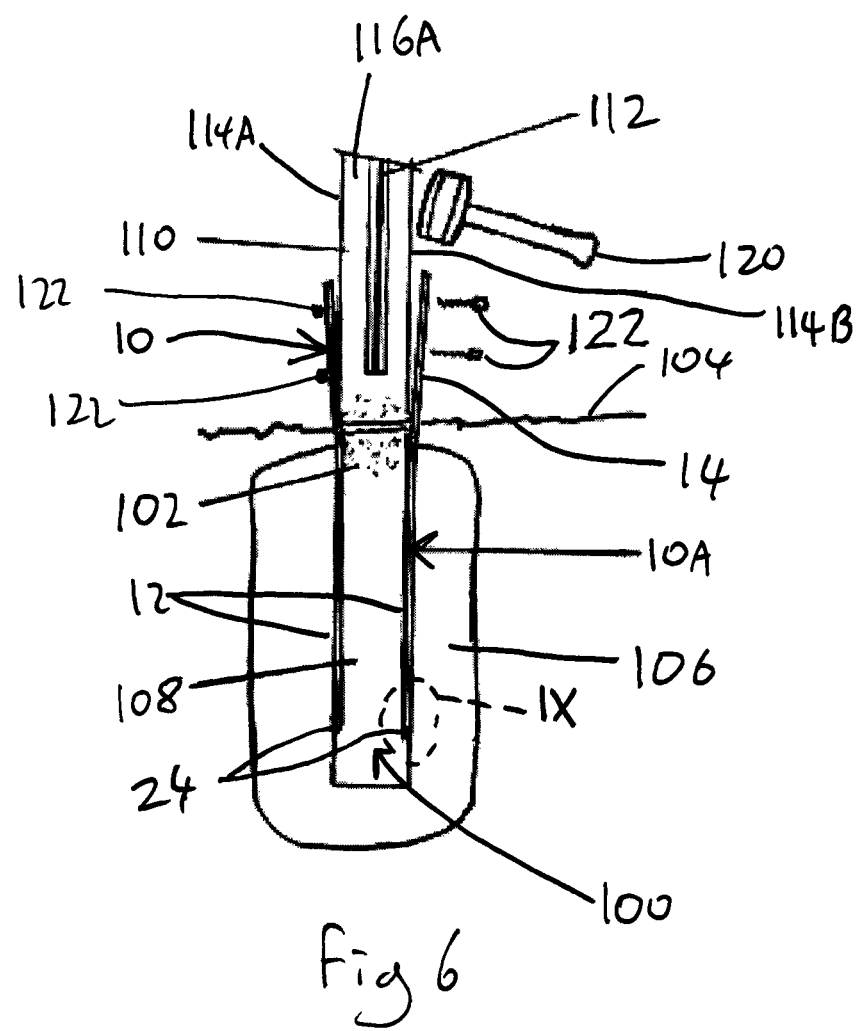
Figure 7:
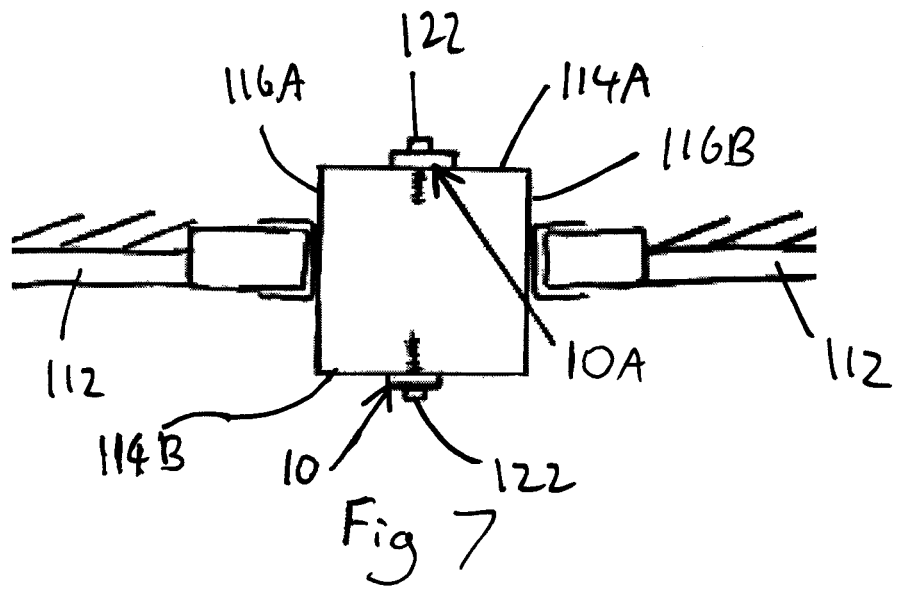
Figure 8:
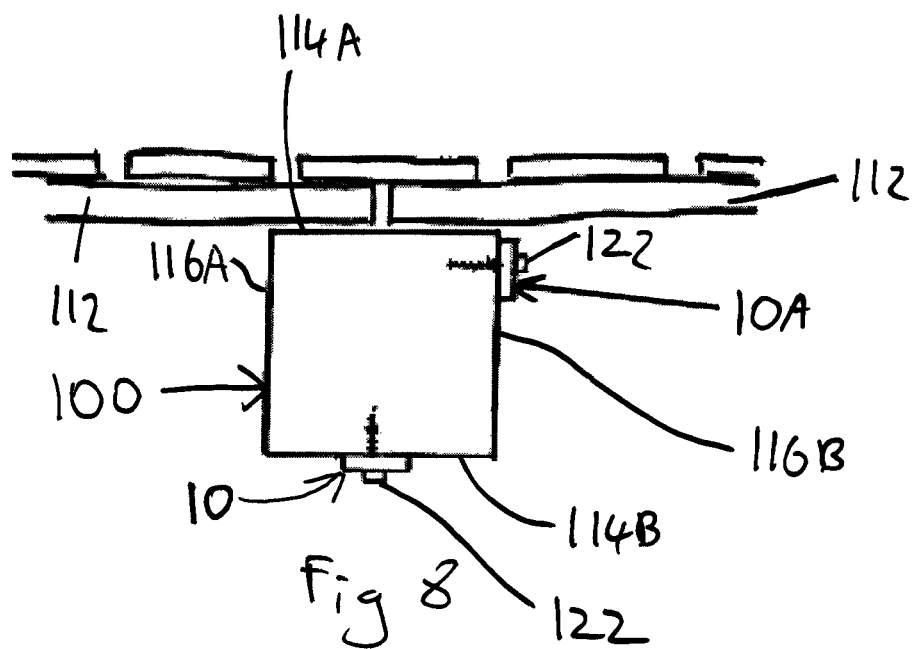
Figure 9:
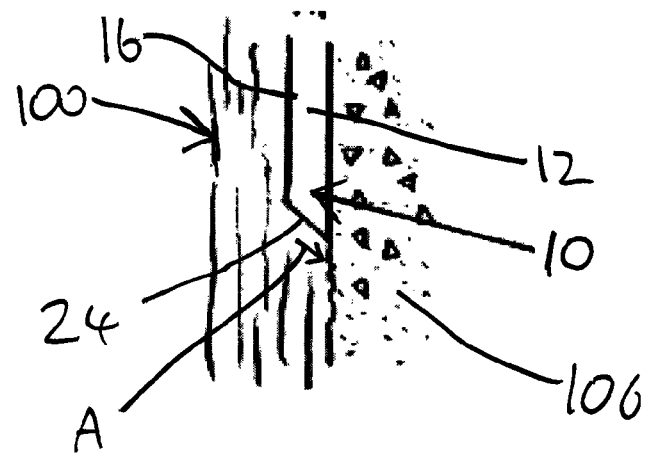
Figure 10:
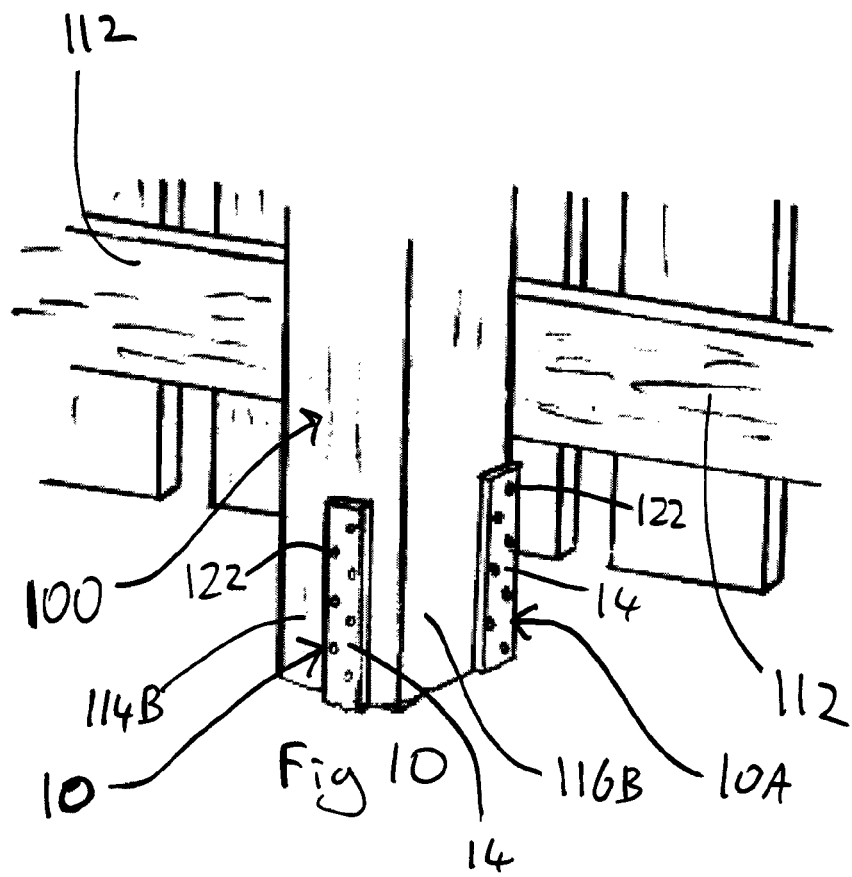

An embodiment of the invention will now be described by way of example only, with reference to the accompanying drawings, in which:

FIG. 1 is a front view of a repair arrangement;
FIG. 2 is a front view of the region marked II in FIG. 1;
FIG. 3 is a view along the lines III-III in FIG. 1;
FIG. 4 is a view of the region marked IV in FIG. 1;
FIG. 5 is a view along the lines V-V in FIG. 1;
FIG. 6 shows two repair arrangements in use;
FIG. 7 shows two repair arrangements in use in a first arrangement on an article;
FIG. 8 shows two repair arrangements in use in a second orientation of an article;
FIG. 9 is a close up of the region marked IX in FIG. 6;
FIG. 10 shows a repaired fence post;
FIG. 11 is a rear view of a further embodiment of a repair arrangement; and
FIG. 12 is a front view of the repair arrangement shown in FIG. 11.

FIG. 1 shows a repair arrangement in the form of a stake 10 for repairing a wooden post 100. The stake 10 is elongate and comprises an elongate insertion portion 12 and an elongate securing portion 14 attached to the insertion portion 12. As can be seen from FIGS. 2 to 5, the stake 10 is substantially flat and has a width W, which may be substantially 30 mm, and a thickness T, which may be substantially 5 mm.

The insertion portion 12 is intended to be inserted into the ground adjacent the post 100. In the drawings, the post 100 has a decaying region 102 at ground level.

The stake 10 has a front main face 16 which is arranged adjacent the post 100 to be repaired when the stake 10 is driven into the ground. The stake 10 also has a rear main face 18 opposite the front main face 16.

The insertion portion 12 has gripping formations 19 to grip the post 100. In the embodiment shown in FIGS. 1 to 10, the gripping formations 19 are provided on the front main face 16. The gripping formations 19 are in the form of serrations which engage into the post 100 to prevent removal of the stake 10 once inserted. The insertion portion 12 has two sets of the gripping formations 19 spaced from each other along the front main face 16.

Referring to FIGS. 4 and 5, the insertion portion 12 has an end region 20 having an end edge 22, and chamfered side edges 23. The end region 20 has a front end face 24 which tapers outwardly from the lower end edge 22 to the front main face 16.

The end region 20 also has a rear end face 26, which is coplanar with the rear main face 18. As can be seen, the end region 20 tapers along only one face, namely the front end face 24.

In the embodiment shown, the tapering of the front end face 24 of the end region 20 has the advantage of ensuring that the stake 10 is driven into the ground alongside the post 100, and does not deviate into the post 100.

The securing portion 14 is provided with a plurality of securing formations in the form of apertures 28 and one or more slots 29. The apertures 28 and the slots 29 are defined by the securing portion 14 in spaced relationship to one another along the length of the securing portion 14.

Referring to FIG. 6, there is shown a post 100, which is held in the ground 104 at a lower region 108 by a block of concrete 106. The regions 108, 110 below and above the decaying region 102 are sound. The post 100 is a fence post and supports a pair of fence panels 112 extending on opposite sides of the post 100. Only one of the fence panels 112 is shown in FIG. 6.

The fence post 100 is of a rectangular configuration in top plan view having opposite first faces 114A, 114B and opposite second faces 116A, 116B adjacent the first faces 114A, 114B. In FIG. 6, the fence panels 112 are supported by the post 100 along opposite second faces 116 of the post 100.

In order to repair the post 100, a first repair stake 10 is driven in-between the concrete 106 and one of the first faces 114A.

The stake 10 is disposed so that the front main face 16 faces towards the first face 114A of the post 10. In this position, the tapered end region 24 also faces towards the first face 114A of the post 100.

The stake 10 is driven between the lower region 108 of the post 10 and the concrete 106 by the use of a hammer 120. The positioning of the tapered end region 24 of the stake 10, facing towards the first face 114A of the post 100 causes the stake 10 to be driven in a straight line along the post 100 adjacent to the concrete 106.

When the stake 10 has been driven between the concrete 106 and the post 100 to such an extent that it cannot be driven any further, the securing portion 14 of the stake 10 is then secured to the region 110 of the post 100. In order to secure the securing portion 14 to the post 100, a suitable fastener 122 in the form of a screw is driven into the post 100 initially through the slot 29. The post 100 is then held in a vertical position, which can be determined by, for example a spirit level. The screw 122 in the slot 29 can then be tightend, thereby securing the post 100 in the vertical position. Further fasteners 122, in the form of screws or nails, can then be driven into the apertures 28 in the securing portion 14 so that the post 100 is securely fixed in place.

When the repair stake 10 has been secured to the post 100 as described above, a second repair stake (designated 10A in FIG. 6) is then driven into the ground adjacent the first face 114B opposite the first stake 10, in the same way as described above. The second stake 10A is then secured to the post 100 in the same manner as described above. With the second stake 10A, there will be no need to position the post 100 vertically, because it is already being held vertical by the first repair stake 10.

FIGS. 7 and 8 show different positions of the stakes 10, 10A to the post 100 for different ways in which the fence panels 112 are supported by the post 100. In FIG. 7 the stakes 10, 10A are driven into the ground adjacent the opposite first faces 114A, 114B of the post 100 in the same way as shown in FIG. 6.

However, in the case of the post 100 shown in FIG. 8, the fence panels 112 are supported at the first face 114A of the post 100. The first repair stake 10 is driven into the ground between the concrete 106 and the first face 114B opposite first face 114A and the fence panels 112. The first stake 10 is then secured to the first face 114B by the use of fasteners driven through the slot 29 and the apertures 28 in the securing portion 14 thereof.

The second stake 10A cannot be driven into the ground adjacent the first face 114A opposite the first stake 10, because of the presence of the fence panels 112. In view of this, the second repair stake 10A is driven into the ground in engagement with the second face 116B of the post 100 as close to the face 114A as possible. The second stake 10A is secured to the post at the second face 116B by fasteners 122 in the same way as described above.

If desired, a third stake (not shown) can be driven into the ground adjacent the second face 116A opposite the second repair stake 10A.

Referring to FIG. 9, there is shown a close-up of the region marked IX in FIG. 6, in which it can be seen that the stake 10 extends adjacent the concrete 106 and may gouge a small part of the post 100 as it is driven into the ground. The tapered end region 24 urges the stake 10 in the direction indicated by the arrow A, towards the concrete 106.

FIG. 10 shows a repaired post 100 which supports fence panels 112 adjacent one of the faces 114 of the post 100. In FIG. 10, a first stake 10 has been driven into the ground adjacent the face 114 opposite the fence panels 112. The securing portion 14 is secured to the post 100 by the fasteners 122 extending through the apertures 28.

The second stake 10A is secured to the post 100 at one of the faces 116 which extends perpendicular to the faces 114. Again, the securing portion 14 is secured to the post 100 by the use of fasteners 122 extending through the apertures 28.

There is thus described a repair arrangement in the form of a stake 10 and a method for using the stake 10 which can be used to repair decayed and/or damaged posts, such as fence posts without the need to remove the post.

Various modifications can be made without departing from the scope of the invention. For example, FIGS. 11 and 12 show a further embodiment of the stake 10 which includes many of the features of the embodiment described above, and these features have been designated with the same reference numerals as the corresponding features shown in FIGS. 1 to 10.

The embodiment shown in FIGS. 11 and 12 differs from the embodiment shown in FIGS. 1 to 10, in that the front main face 16 has three sets of the gripping formations 19 spaced therealong. Also, the rear main face 18 has a further two sets of the gripping formations 19 spaced from each other therealong.

The embodiment shown in FIGS. 11 and 12 also includes instructions on the front main face 16, namely "this side face out" and "max" to instruct the user as to the orientation of the stake 10 relative to the post 100 and the maximum depth to which it should be driven into the ground. A line 220 is formed in the front main face 16 to indicate the aforesaid maximum depth more clearly.

The invention claimed is:

1. A repair stake comprising an elongate insertion portion and an elongate securing portion, wherein the insertion portion is configured for insertion into the ground adjacent an article to be repaired, and the securing portion having securing formations to allow the repair stake to be secured to the article to be repaired, wherein the repair stake is substantially flat, having a tapered end region on the insertion portion, and front and rear opposite main faces extending from the tapered end region; wherein the tapered end region has an end edge and a front end face tapering outwardly from the end edge to the front main face; and wherein the tapered end region has a rear end face extending from the end edge to the rear main face, the rear end face being coplanar with the rear main face; and the securing formations are apertures defined in the securing portion extending from the front main face to the rear main face, the apertures being configured to receive therethrough fasteners, and wherein one of the apertures is a slot defined in the securing portion.

2. A repair stake according to claim 1, wherein the tapered end region has no more than one tapered end face.

3. A repair stake according to claim 1, wherein the repair stake includes gripping formations to engage the article, the gripping formations being provided on one or both of the front main face and the rear main face.

4. A repair stake according to claim 3, wherein the gripping formations are provided on the insertion portion.

5. A repair stake according to claim 3, wherein the gripping formations comprise serrations.

6. A repair stake according to claim 5, wherein the apertures are defined in the securing portion along the length thereof.

7. A repair stake according to claim 1, wherein the repair stake has a width and a depth, the width being greater than the depth.

8. A repair stake according to claim 1, wherein the repair stake is in the form of a one piece unit, wherein the insertion portion and the securing portion are opposite end portions of the one piece unit.

9. A method of repairing an article, said method comprising driving a repair stake as claimed in claim 1 into the ground adjacent to the article to be repaired, and securing the repair stake to the article using the securing formations.

10. A method according to claim 9, wherein the repair stake is arranged adjacent the article with the tapered front end face facing the article.

11. A method according to claim 9, wherein when the article is secured in the ground with concrete, the repair stake is driven into the ground between the concrete and the article, whereby the repair stake is held between the concrete and the article.

12. A method according to claim 9, wherein the article is a post having a top plan profile in the shape of a rectangle, and two repair stakes are arranged adjacent two of the sides of the rectangle.

13. A method according to claim 9, wherein the repair stake is arranged adjacent the article to restrict movement of the article in at least one vertical plane.

14. A method of repairing a post, said method comprising driving the repair stake according to claim 1 into the ground adjacent to the post to be repaired, wherein said slot extends longitudinally of the securing portion, and the method further comprises securing the repair stake to the post by inserting fasteners through the apertures into the post, wherein a first of said fasteners is inserted through the slot into the post prior to the insertion of each other fastener through the apertures, thereby allowing the post to be arranged in a vertical orientation.

15. A method according to claim 14, wherein the method comprises arranging the repair stake adjacent the post with the tapering front end face facing the post.

16. A method according to claim 14, wherein when the post is secured in the ground with concrete, the repair stake is driven into the ground between the concrete and the post, whereby the repair stake is held between the concrete and the post.

17. A method according to claim 14, wherein the post has a top plan profile in the shape of a rectangle, and two repair stakes are arranged adjacent two of the sides of the rectangle.

18. A method according to claim 14, wherein the repair stake is arranged adjacent the post to restrict movement.

* * * * *